US United States Patent [19]
Brown et al.

[11] 3,732,926
[45] May 15, 1973

[54] METHOD FOR RECOVERY OF HYDROCARBONS UTILIZING STEAM INJECTION

[75] Inventors: Alfred Brown; Joseph T. Carlin; Marc F. Fontaine; Stewart Haynes, Jr., all of Houston, Tex.

[73] Assignee: Texaco Inc, New York, N.Y.

[22] Filed: June 1, 1971

[21] Appl. No.: 148,888

[52] U.S. Cl. .................................166/272, 166/303
[51] Int. Cl. ................................................E21b 43/24
[58] Field of Search.................166/272, 303, 271, 166/273–274

[56] References Cited

UNITED STATES PATENTS 3,279,538  10/1966  Doscher..........................166/271 X
3,490,532  1/1970  Carlin.............................166/272 X
3,554,286  1/1971  Feuerbacher.....................166/266
3,593,790  7/1971  Herce...............................166/267
3,527,303  9/1970  Zwicky............................166/303

*Primary Examiner*—Robert L. Wolfe
*Attorney*—Thomas H. Whaley and Carl G. Ries

[57] ABSTRACT

A method of recovering hydrocarbons from a subterranean hydrocarbon-bearing formation wherein a mixture of steam and a minor amount of an interfacial tension reducer, such as quinoline, etc. is introduced into the formation and oil displaced through the formation is recovered through a production well. Preferably, the formation is heated prior to the introduction of the steam-interfacial tension reducer mixture.

12 Claims, No Drawings

METHOD FOR RECOVERY OF HYDROCARBONS UTILIZING STEAM INJECTION

BACKGROUND OF THE INVENTION

1. Field of the Invention

This invention relates to an improved method for recovering hydrocarbons, including highly viscous crudes, from a subterranean hydrocarbon-bearing formation. More particularly, this invention relates to a method of recovery in which a mixture of steam and a minor amount of an interfacial tension reducer, such as quinoline, is introduced into the formation and displaced toward a production well following which oil is recovered through the production well.

2. Description of the Prior art

The production of hydrocarbon products is usually achieved by drilling into a hydrocarbon-bearing formation and employing one of the art-recognized recovery methods for the recovery of the hydrocarbons therein. Present recovery techniques, however, usually result in the recovery of only a minor portion of the petroleum materials present in the formation and this is particularly true with reservoirs of viscous crudes. Even when employing improved secondary recovery practices as much as 50–75 percent of the original hydrocarbons may be left in place and even more in the case of viscous hydrocarbon reservoirs.

A variety of processes well known in the art, such as water flooding, steam flooding, miscible flooding, etc. have been employed after natural drive of the reservoir has been depleted in order to recover additional oil from the formation. The application of these techniques which are sometimes referred to as secondary recovery methods permits additional hydrocarbons to be removed from the partially depleted formations. One of the more widely practiced secondary recovery methods is that of the so-called steam flooding process. Steam flooding is notable well-suited for secondary recovery operations since the energy contained in the fluid effectively reduces the viscosity of the hydrocarbons and permits production thereof. In order to realize the maximum viscosity reduction of the hydrocarbons, the injected steam should impart the maximum heat to the formation, as is consistent with economical steam generator design, and provide a uniform penetration of the formation.

Despite the advantages of steam flooding operations, under certain circumstances present-day steam flooding techniques fail in many instances to permit recovery of large quantities of hydrocarbons contained in the formation. As a result, a number of modified steam injection processes have been proposed including a "push-pull" technique and throughout methods which have resulted in some instances in additional significant recoveries of crude oil from the reservoirs. Even with the modified steam flooding techniques proposed and in operation today major quantities of the oil in place in the reservoir may remain after a substantial period of time since the crude is tightly bound to the formation. In addition, interfacial tensions between the immiscible phases may result in entrapping crude in the pores, thereby reducing recovery.

One disadvantage of steam flooding is that some distillation in the formation takes place with the result that lighter, more volatile solutions of the in-place hydrocarbons are recovered leaving behind the more viscous oil with an increased asphaltene and aromatic content. Thus, the nature of the residual oil left behind after an initial period of steam flooding of a formation is probably different from that of the original oil composition in place because of distillation effects, etc. and the efficiency of the removal process gradually declines.

Accordingly, it is an object of the present invention to overcome the disadvantages of the prior art steam flooding process by providing an efficient, improved steam flooding method for hydrocarbon recovery.

Another object of this invention is to provide a method of recoverying hydrocarbons by means of injecting steam in combination with an interfacial tension reducer into the hydrocarbon-bearing formation to improve the flow characteristics thereof.

BRIEF SUMMARY OF THE INVENTION

This invention provides an improved method of recovering hydrocarbons from a subterranean hydrocarbon bearing formation wherein the formation is penetrated by an injection well and a production well which comprises:

a. injecting a mixture of steam and a minor amount of an interfacial tension reducer selected from the group consisting of nitroanisole, pyridine, quinoline, closely related derivatives of nitroanisole, pyridine, quinoline, coal tar fractions containing at least one member of the group consisting of pyridine, quinoline and mixtures thereof, into the formation through said injection well to drive said hydrocarbons toward said production well, and b. recovering hydrocarbons through the said production well.

Preferably, before step $a$ steam is injected into the formation via the injection well in order to heat the hydrocarbon-bearing formation in the vicinity of the well. Sufficient steam may be injected into the formation to effect steam breakthrough into the production well in this step although, preferably, the amount of steam utilized in this preheating step will be from about 0.01 to about 0.5 pore volume percent of the hydrocarbon-bearing formation.

In another embodiment (A) the invention relates to a method wherein step $a$ above is followed by step $a_1$ in which a driving fluid such as cold water, hot water or steam, as desired, is injected into the formation. Likewise, the method of this invention may be conducted as a cyclic operation (Embodiment B) repeating steps $a$ and $a_1$ in sequence.

DETAILED DESCRIPTION OF THE INVENTION

Suprisingly, it has been found that the introduction of steam containing a minor amount of an interfacial tension reducing agent results in a substantial increase in the amount of oil recovered from an oil-bearing formation during a steam flooding operation.

A variety of interfacial reducing materials may be employed in the method of this invention such as nitroanisole, pyridine, quinoline, closely related derivatives of these, coal tar fractions containing at least one member of the group consisting of pyridine and quinoline, and mixtures thereof. Such interfacial tension reducing agents show a solubilizing effect and, in addition, an emulsifying effect, at least upon the asphaltene portions of the crude in the formation.

The amount of the interfacial tension reducing agent added as a component of the steam mixture can be varied over a wide range and generally will be from about 0.10 to about 15.0 weight percent based on the weight of the mixture and preferably from about 0.5 to about 5.0 weight percent on the same basis. The introduction of the interfacial tension reducing agent into the steam to form the desired mixture can be accomplished in a variety of ways. For example, it can be introduced downstream from the steam generator as an alkaline solution.

In preparing the alkaline solution of the interfacial tension reducing agent a variety of alkaline agents may be employed, such as alkaline metal hydroxides, alkaline earth metal hydroxides and basic salts of the alkaline or alkaline earth metals which are capable of hydrolyzing in an aqueous medium to give an alkaline solution. The concentration of the alkaline agent is about 0.001 molar to 0.5 molar to give the required alkaline solution.

In embodiments A and B previously described, the quantity of the steam together with the interfacial tension reducer injected into the well in step a will vary within relatively wide limits and will depend on a number of conditions such as thickness of the formation, its characteristics and the conditions for the subsequent injection of the aqueous drive medium (step $a_1$).

Where hot water or steam is employed as the driving fluid the temperature of the water may range up to about 210°F while steam temperature of up to about 670°F may be utilized, the exact temperatures employed being fixed by optimum conditions of operation.

Hydrocarbons recovered from the formation by the process of this invention are in part recovered at the production wells in the form of oil-in-water emulsions. Separations of the hydrocarbons from the emulsions is accomplished by one of several available emulsion breaking techniques.

The exact mechanism by which the steam containing a minor amount of the interfacial tension reducing agent added in alkaline solution thereto operates to permit the recovery of substantial additional quantities of hydrocarbons from the hydrocarbon bearing formation is not completely understood; however, it is believed that the interfacial tension reducing agent is effective in releasing the crude from the formation pore surfaces so that the surfaces can be exposed to the alkaline agent which in turn improves the wettability of the surface permitting additional recovery of the crude. Another advantage of the use of the alkaline interfacial tension reducer mixture is the ability of this mixture to form an emulsion with improved mobility characteristics with a part or all of the extracted crude depending on the conditions under which the method of the invention is operated.

The following example illustrates one embodiment of this invention and is to be considered not limitative.

EXAMPLE I

In this experiment a linear flow cell constructed with 347 stainless steel pipe and packed with pure silica to form a sand pack 24 inches in length by 2⅞ inches O.D. was employed. The cell was equipped with a distribution plate at each end to permit injection and production over the entire cross sectional area of the porous media. A steam generator equipped to generate superheated steam was connected to the inlet line entering the linear flow cell. Effluent or production from the steam flooding of the sand pack was collected in graduated cylinders at atmospheric pressure and a steam condenser system was provided for use when steam breakthrough occurred at the outlet end. Mercury pumps equipped to inject mercury at suitable rates into cylinders containing oil, water and the additive solution were employed in saturating the cell with heavy crude oil, injecting water to the generator and for additive addition. Steam at a constant pressure was injected into the flow cell and the quinoline additive in alkaline solution was added at constant rate into the steam phase throughout the duration of the flood.

In conducting this example, the sandpack was first saturated with 97.5 percent oil (i.e. Aldwell Crude) of 16.4 API gravity utilizing the mercury pump system previously described. Water was then fed into the steam generator and steam at a constant pressure of 200 psig and at a temperature of about 595°F was injected into the inlet line connected to the flow cell. After steam was established at the injection sand face (382°F), and alkaline-quinoline solution (0.02 M NaOH—0.5 weight percent quinoline) was added to the steam phase at a constant rate of 0.125 cc/min for the duration of the flood. The steam and additive were introduced into the cell over a period of about 4 hours and the oil production was recovered in the form of an emulsion from which 206.1 grams of oil were obtained. The oil was measured after breaking the emulsion with heat and a demulsifier (Trete-O-Lite R-33, a commercial demulsifier marketed by the Tretolite Division of the Petrolite Corporation). The total amount of oil recovered was 471.3 grams. The residual oil saturation (Sor) of the sandpack based on the total sandpack pore volume was determined to be 21.0 pore volume percent.

When this experiment was repeated in the same manner using only steam as the flooding medium an Sor value of 25.2 pore volume percent was obtained. This indicates a significant increase in recovery of about 4 pore volume percent was achieved using the alkaline-quinoline additive.

The properties of the crude oil utilized in Example I are set out below:

Aldwell Crude, Sutton Country, Tex.
a. API Gravity = 16.4° (.9567 gm/cc)
b. Oil Composition
  1. Paraffin 46.9%
  2. Aromatics 39.1%
  3. Asphaltenes 14.0%
c. Oil Viscosity (233 cs at 100°F and 15.9 cs at 210°F)
d. Pour Point 0°F

What is claimed is:

1. A method for recovering hydrocarbons from a subterranean hydrocarbon-bearing formation penetrated by an injection well and a production well which comprises:

a. forming a mixture of steam and a minor amount of an interfacial tension reducer selected from the group consisting of nitroanisole, pyridine, quinoline, closely related derivatives of nitroanisole, pyridine and quinoline, and coal tar fractions containing at least one member of the group consisting of pyridine, quinoline, and mixtures thereof,
  b. injecting the said mixture into the hot formation through said injection well to drive said hydrocarbons toward said production well, and
  c. recovering hydrocarbons through said production well.

2. The method of claim 1 wherein in step *a* the said mixture is an alkaline mixture of steam and the said interfacial tension reducer.

3. The method of claim 1 wherein in step *a* the interfacial tension reducer is quinoline.

4. The method of claim 1 wherein in step *a* the said mixture contains from about 0.10 to about 15.0 weight percent of the said interacial tension reducer.

5. The method of claim 1 wherein in step *a* the said mixture is formed by adding to the steam an aqueous solution of an alkaline agent and an interfacial tension reducer selected from the group consisting of nitroanisole, pyridine and quinoline, closely related derivatives of nitroanisole, pyridine and quinoline, and coal tar fractions containing at least one member of the group consisting of pyridine, quinoline, and mixtures thereof.

6. The method of claim 1 wherein in step *a* the said mixture is formed by adding to the steam an aqueous solution containing about 0.1 to about 0.5 weight percent of sodium hydroxide and about 0.1 to about 0.5 weight percent of quinoline.

7. The method of claim 1 wherein in step *a* the said mixture is formed by adding to the steam an aqueous solution of about 0.1 to about 0.5 weight percent of sodium hydroxide and about 0.1 weight percent of orthonitroanisole.

8. The method of claim 1 wherein prior to step *a* the hydrocarbon-bearing formation in the vicinity of the injection well is heated by injecting steam via the said injection well.

9. The method of claim 1 wherein prior to step *a* the hydrocarbon-bearing formation in the vicinity of the injection well is heated by injecting from about 0.01 to about 0.5 pore volume percent of steam via the said injection well.

10. The method of claim 8 wherein in a separate step $a_1$ an aqueous driving fluid is injected into the formation after step *a*.

11. The method of claim 10 wherein in a cyclic operation steps a and $a_1$ are repeated in sequence.

12. The method of claim 10 wherein the said aqueous driving fluid is steam.

* * * * *